United States Patent
Resch

(10) Patent No.: US 9,518,775 B2
(45) Date of Patent: Dec. 13, 2016

(54) COOLING APPLIANCE

(71) Applicant: Reinhold Resch, St. Peter (AT)

(72) Inventor: Reinhold Resch, St. Peter (AT)

(73) Assignee: AHT Cooling Systems GmbH, Rottenmann (AT)

( * ) Notice: Subject to any disclaimer, the term of this patent is extended or adjusted under 35 U.S.C. 154(b) by 0 days.

(21) Appl. No.: 14/399,794

(22) PCT Filed: Apr. 15, 2013

(86) PCT No.: PCT/EP2013/057826
§ 371 (c)(1),
(2) Date: Nov. 7, 2014

(87) PCT Pub. No.: WO2013/167352
PCT Pub. Date: Nov. 14, 2013

(65) Prior Publication Data
US 2015/0115782 A1    Apr. 30, 2015

(30) Foreign Application Priority Data
May 9, 2012 (DE) .................... 20 2012 101 699 U

(51) Int. Cl.
| F25D 23/02 | (2006.01) |
| F25D 23/08 | (2006.01) |
| A47F 3/04 | (2006.01) |
| F25D 11/00 | (2006.01) |

(52) U.S. Cl.
CPC .......... *F25D 23/021* (2013.01); *A47F 3/0413* (2013.01); *A47F 3/0434* (2013.01); *F25D 11/00* (2013.01); *F25D 23/028* (2013.01); *F25D 23/087* (2013.01); *Y02B 40/34* (2013.01)

(58) Field of Classification Search
CPC .......... A47F 3/00; A47F 3/043; A47F 3/0434; A47F 3/0404; A47F 3/0469; A47F 3/04; A47F 3/413; F25D 23/02; F25D 23/021; F25D 23/026; F25D 23/08; F25D 23/028; F25D 23/087; F25D 11/00; E05D 15/06; E05D 15/0647; E05D 15/0682; E06B 3/4663; Y02B 40/34
(Continued)

(56) References Cited

U.S. PATENT DOCUMENTS

| 2,569,763 | A | * | 10/1951 | Hofferberth ................... 312/295 |
| 3,584,417 | A | * | 6/1971 | Gatton ................ E05D 15/0686 312/116 |
| 4,753,084 | A | * | 6/1988 | Aoki .............................. 62/246 |

(Continued)

FOREIGN PATENT DOCUMENTS

| AT | DE 202012102258 U1 * | 8/2012 | ............. A47F 3/043 |
| WO | WO 2011/116853 A1 | 9/2011 | |

*Primary Examiner* — Daniel J Troy
*Assistant Examiner* — Ryan A Doyle
(74) *Attorney, Agent, or Firm* — Pauley Erickson & Kottis

(57) ABSTRACT

A cooling appliance or refrigeration unit having at least one refrigeration compartment that is contained in a housing and is accessible from above via at least one laterally movable sliding lid containing a transparent window, which has a heat-reflecting inner coating and at least in its front longitudinal region, via an outwardly convex curvature perpendicular to the longitudinal direction, comes to an end in a longitudinal edge that has a front frame. An effortless sliding action with a simultaneously reliable seal is achieved by the front frame having a bearing surface that is oriented horizontally relative to a vertical direction of gravity.

17 Claims, 3 Drawing Sheets

(58) Field of Classification Search
USPC .......... 312/116, 296, 401, 405; 49/425, 409, 49/411, 413; 220/592.02, 592.04, 592.09, 220/592.11
See application file for complete search history.

(56) References Cited

U.S. PATENT DOCUMENTS

| | | | |
|---|---|---|---|
| 5,588,421 A * | 12/1996 | Busch et al. | 126/200 |
| D541,827 S | 5/2007 | Resch | |
| D586,366 S | 2/2009 | Resch | |
| 8,430,460 B2 * | 4/2013 | Erro et al. | 312/116 |
| 2010/0281910 A1 * | 11/2010 | Riemeijer et al. | 62/449 |
| 2013/0008090 A1 * | 1/2013 | Lanzl et al. | 49/413 |

* cited by examiner

COOLING APPLIANCE

BACKGROUND OF THE INVENTION

Field of the Invention

This invention relates to a cooling appliance, also interchangeably referred to as a refrigeration unit, having at least one refrigeration compartment contained in a housing and accessible from above via at least one laterally movable sliding lid that contains a transparent window, which in particular has a heat-reflecting inner coating and which at least in its front longitudinal region by way of an outwardly convex curvature perpendicular to a longitudinal direction comes to an end in a longitudinal edge that has a front frame.

Discussion of Related Art

A refrigeration unit of this type is disclosed in U.S. Pat. No. D541,827 S. In it, a housing that encloses an essentially box-shaped refrigeration compartment for products, has longitudinally movable sliding lids at the top that are guided in a sliding fashion along their lateral edges extending in a longitudinal direction of the housing in order to open the refrigeration compartment at the top for removing or inserting products and then close it again in a favorably sealed fashion. The guides, however, are subjected to a not insignificant amount of stress, can become dirty over time, and thus experience wear that has a negative impact on the effortless action of the sliding lids and their sealing function over time.

A chest-like refrigeration unit is also disclosed in U.S. Pat. D586,366 S.

SUMMARY OF THE INVENTION

One object of this invention is to provide a refrigeration unit of the type mentioned above but in which the effortless sliding action and the reliable sealing properties are retained in a long-lasting fashion.

The above and other objects are attained by the features of the front frame having a bearing surface that is oriented horizontally relative to the vertical direction of gravity as described in this specification and in the claims.

The horizontal bearing surface of the front frame provides a flat, horizontal sliding surface or sliding track with a flat support of the lower longitudinal edge of the cross-sectionally curved sliding lid or lids against the force of gravity, with advantageous travel properties and a seal across a wide area. The horizontal sliding surface also has a low sensitivity to dirt because it does not contain narrow cavities and can easily be cleaned. The embodiment of the sliding lid with the sealed frame also contributes to energy-saving operation over time. The energy efficiency can be improved even further if the inner surface of the window additionally has a heat-reflecting inner coating.

For the seal and the travel properties, it is advantageous for the horizontal bearing surface to be provided with a sealing element.

The fact that a front, cross-sectionally vertical edge of the frame serves as a supporting section for a longitudinal guidance and has spacer elements that protrude beyond its frontal plane contributes to the effortless movement and simultaneously favorable guidance.

In one embodiment that is advantageous from a design and function standpoint, the frame is embodied in the form of a longitudinal profile with a connecting section that embraces an inner and outer surface region of the window at the front longitudinal edge and is embodied with a bearing section that is formed onto the latter and oriented at an angle to it, which is provided with the horizontal bearing surface. The frame can be advantageously manufactured out of plastic.

One good function is also promoted because the underside of the sealing element has good sliding properties and is embodied as a separate sealing element mounted on the horizontal bearing surface.

It is also advantageous from a design and function standpoint for the bearing section to have a longitudinally extending receiving chamber, which is bounded on its underside by an end wall with the bearing surface and into which a holding section of the sealing element is inserted. For example, this design makes it possible to easily replace a damaged sealing element.

If the spacer elements have externally arched support surfaces, this provides an effortless guidance along a front guiding section with a minimal amount of transverse force thanks to a point-by-point support by the spacer elements.

If the rear longitudinal edge of the window has a rear frame that has a bearing section with a horizontal bearing surface on its underside, this also contributes to an effortless sliding and favorable sealing action.

The good traveling and sealing properties with energy-efficient operation have an advantageous effect, for example, in a design in which the window rises from the front longitudinal edge via the convex curvature and transitions into a flat, horizontal region that adjoins it at the rear, which rear longitudinal edge has the rear frame that has the horizontal bearing surface. A sealing element is provided that corresponds to the bearing surface of the front frame.

In one embodiment, for example, the upper edge region of the housing has a cover frame that has at least one longitudinally extending support surface, which is matched to the position and size of the bearing surface, and has a guide section, which is matched to the position and size of the supporting section.

BRIEF DESCRIPTION OF THE DRAWINGS

This invention is explained in greater detail below in view of exemplary embodiments shown in the drawings, wherein.

DETAILED DESCRIPTION OF THE INVENTION

Figure 1:
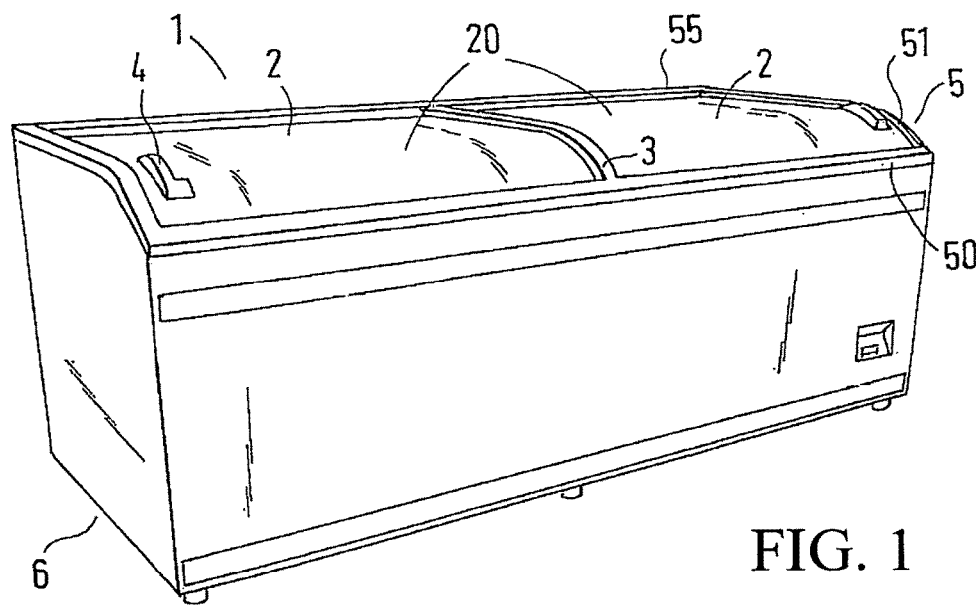
FIG. 1 shows a perspective view of a refrigeration unit with sliding lids, viewed from an oblique frontal angle.

FIG. 1 shows a chest-like cooling appliance or refrigeration unit 1 with an essentially box-shaped housing 6 enclosing a refrigeration compartment for products, with a front wall, two side walls, a rear wall (not visible in the drawing), a floor (likewise not visible), and an openable cover on the top surface. The cover of the housing 6 in this case comprises two sliding lids 2 that slide in the longitudinal direction of the housing and are of a transparent window 20, preferably made of glass or alternatively made of a plastic material such as Plexiglas, and a lid frame 3 that is attached to the edges thereof. Handles 4 are mounted on both of the windows 20 of the sliding lids 2 to enable easy sliding. The upper edge of the housing 6 has a cover frame 5, which includes a front frame part 50, two side frame parts 51, and a rear frame part 55 and on its underside, has receiving structures into which are inserted the upper regions of the wall elements of the housing 6.

Figure 2:
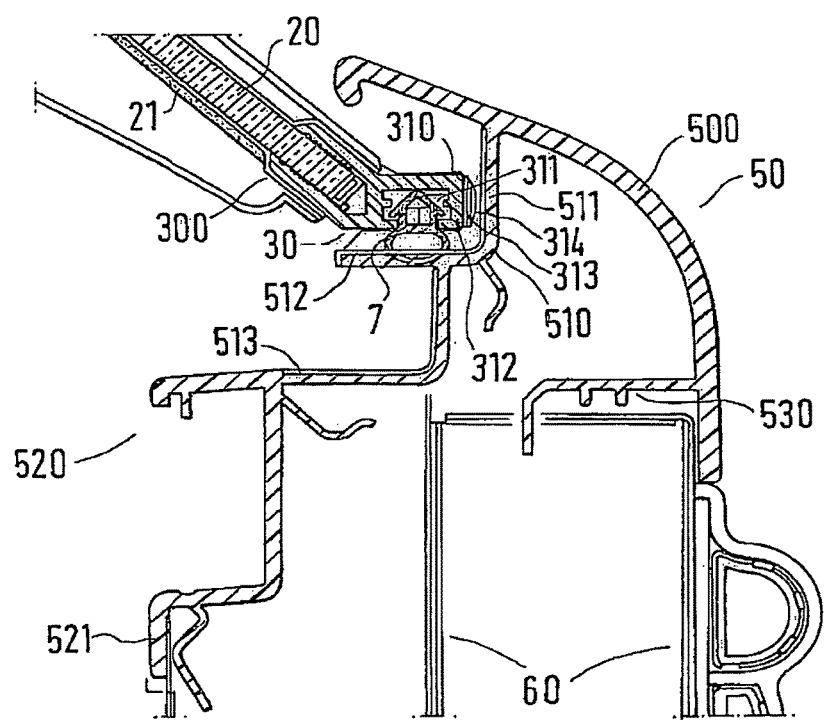
FIG. 2 shows an enlarged cross-sectional detail view of the refrigeration unit in a front guide region of the sliding lid.

As shown in FIG. 2, the inside of the windows 20 has a heat-reflecting inner coating 21 so that thermal radiation striking the windows 20 from the outside is at least partially reflected and, depending on its embodiment and the requirements, also partially absorbed and at least to a large extent, prevented from penetrating into the refrigeration compartment. The windows 20 are transparent or see-through in the visible spectral range so that the products inside the refrigeration compartment can be easily seen from the outside when the lid is closed.

Good visibility of the refrigeration compartment and good accessibility thereto from the front side oriented toward the user are facilitated by the fact that the upper edge of the front wall of the housing 6 is recessed downward relative to the upper edge of the side walls and the rear wall and starting from the rear, the windows 20 first extend over a flat, horizontal section, then via an outwardly convex curvature, and finally downward to the front frame part 50 that covers the upper edge of the front wall. The outer and inner surfaces of the windows 20 in the region of or near the front edge extend diagonally downward toward the front. The angle of the front regions of the outer and inner surfaces or the tangents to these surfaces relative to the vertical (direction of gravity) are significantly greater than 0° here and significantly less than 90° and for example lie in a range between 10° and 85° relative to the vertical, as shown in FIG. 2.

Figure 3:
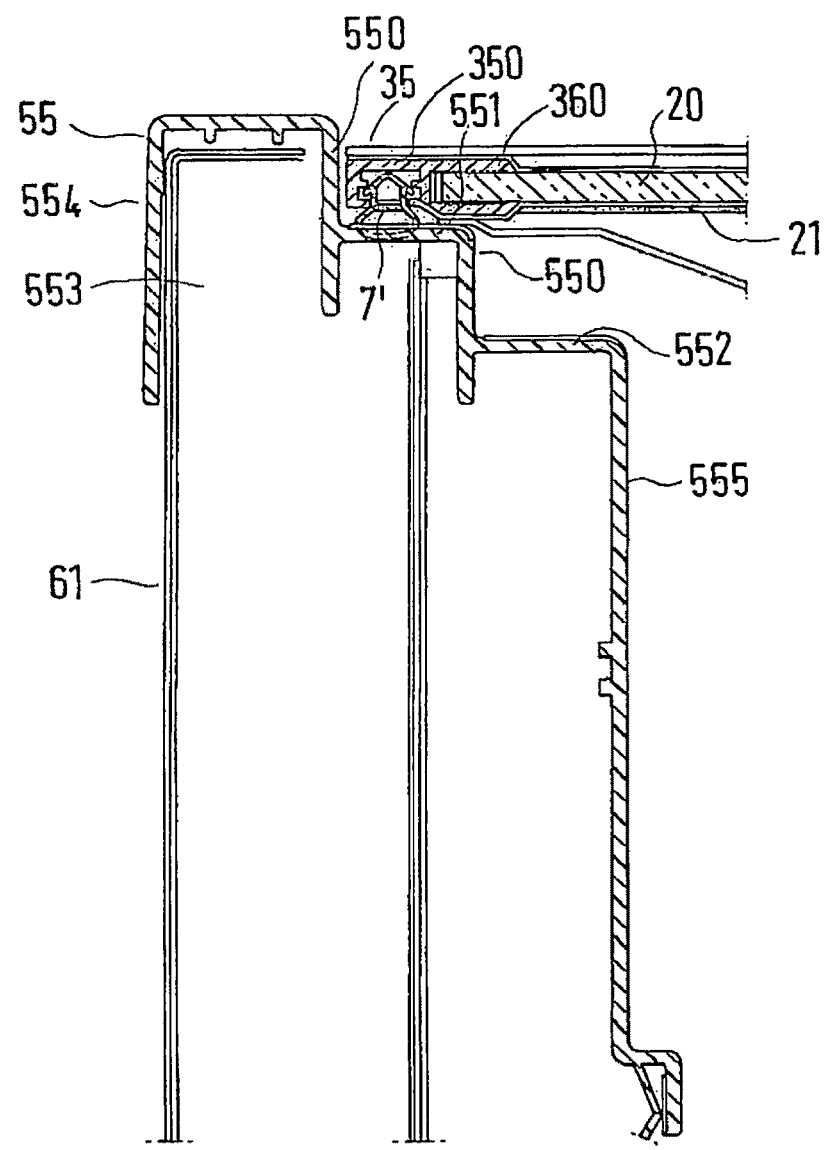
FIG. 3 shows an enlarged cross-sectional detail in a rear guide region of a sliding lid.

The lid frame 3 of the windows 20 includes two side frames, a front frame 30, and a rear frame 35. FIG. 2 shows a cross-section of the front frame 30 and FIG. 3 shows a cross-section of the rear frame 35.

As shown in FIG. 2, a connecting section 300 of the front frame 30 embraces the edge section of the outer surface and inner surface of the window 20 and is fastened to the edge section of the respective window 20. Toward the front, the connecting section 300 is adjoined by a bearing section 310 that is integrally formed onto it, which is oriented at an angle relative to the front section of the window 20 and extends forward horizontally and on its underside, and has a horizontal bearing surface 312. At the front of the bearing section 310, a support section 313 is formed, which is oriented vertically, such as at right angles to the bearing surface 312 in cross-section, and has spacer elements 314 attached to its front side. The bearing section 310 has a longitudinally extending receiving chamber 311 formed into it, whose lower wall is open toward the bearing surface 312 via a central longitudinal gap, thus forming an undercut receiving section similar to a T-groove.

A holding section of a sealing element 7 is inserted into the receiving chamber 311 from beneath and is secured on the inside of the lower end wall by laterally protruding holding lips. The sealing element 7 extending over the length of the front frame 30 extends outward beyond the opening gap on both sides and constitutes or forms a sealed sliding surface between the bearing surface 312 and the flat, horizontal support section 512 that is embodied on the cover frame 5 so that a sliding support for the sliding lid 2 is produced along the front frame part 50 with a flat sliding track and a flat seal. In the exemplary embodiment shown, the bottom section of the sealing element 7 is embodied as hollow and curved outward in a convex fashion, which, as a result of gravity, produces a flat, sealing pressure against the support section 512 with good sealing and travel properties.

Figure 2A:
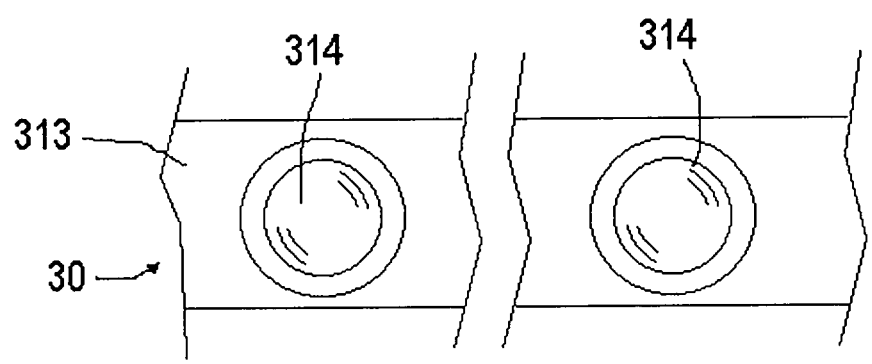
FIG. 2a shows an enlarged detail view of spacer elements.

Opposite from the support section 313 with the spacer elements 314 on the front is the inner surface of the vertical, front guide section 511 that is formed onto the front frame part 50. The spacer elements 314 are advantageously formed so that they are convex toward the outside, thus producing a virtually point-by-point support, such as illustrated in FIG. 2a. For example, two or more spacer elements 314 such as rivets are provided in the longitudinal direction of the support section 313.

The spacer elements 314 enable an exact calibration between the vertical support section 313 and the guide section 5, in order to prevent the sliding lid 2 from wedging in the cover frame 5 as it is opened and closed. These features yield a minimal transverse force along the vertical front support while achieving good sliding properties in the guide thus produced. In this case, a reliable seal is produced while simultaneously achieving an effortless travel of the sliding lid 2, particularly if the sealing element 7 itself has good sliding properties relative to the support section 512.

As also shown in FIG. 2, the front frame part 50 has a front section 500 that is cross-sectionally curved toward the outside and top, which toward the rear, transitions into an upper end section that is situated or positioned as spaced apart from and protruding above the support section 512 and the bearing section 310 resting thereon so that the sliding lid 2 is secured at the top to prevent it from being accidentally lifted away.

Below the upper support section 512, the front frame part 50 has a lower horizontal support section 513 that is formed onto it, which is bounded at the front by a lower, front vertical guide section and is formed onto the underside of the upper support section 512. The lower support section 513 has a horizontal support surface, which is parallel to a support surface 510 of the upper support section 512 and onto which the front frame of the second sliding lid can be placed by a horizontal bearing surface and an interposed sealing element in a manner that corresponds to its front frame 30 so that the two sliding lids 2 can be slid laterally relative to each other, with one overlapping the other. Toward the rear, the lower support section 513 is adjoined by a section that is inclined downward slightly, which permits the bearing section of the front frame of the second sliding lid to be easily inserted and additionally secures it from below. Both the upper support section 512 and the lower support section 513 are open toward the rear, for example, are not bounded by any upwardly protruding projections and can thus be kept clean in an advantageous way and can be cleaned with no trouble.

The front frame 30 and the front frame part 50 are advantageously embodied in the form of longitudinal profiles. At the underside of the frame part 50, a front receiving section 530 and a holding section 521 are provided for the insertion of sections of the front housing wall 60 and on the back surface, a rear recess 520 is provided below the section that protrudes rearward from the lower support section 513. The front frame 30 and the front frame part 50 as well as the remaining sections of the lid frame 3 and cover frame 5 are preferably of or composed of plastic, but can alternatively also be of or composed of another material such as metal. The remaining frame parts and sections of the lid frame 3 are likewise advantageously embodied in the form of profile sections.

As shown in FIG. 3, the rear edge region of the windows 20 has a rear frame 35. In accordance with the front edge region, the adjoining outer and inner surfaces of the windows 20 are embraced by a connecting section 360, which is adjoined at the rear by a horizontally oriented bearing section 350, which is integrally formed onto it and has a horizontal bearing surface on its underside. The bearing section 350 likewise has a longitudinally extending receiving chamber with a longitudinally extending opening gap in its lower edge section, into which a holding section of a sealing element T is inserted, as described above in connection with the front frame 30 and as shown in FIG. 2. The lower section of the sealing element 7' is hollow and cross-sectionally curved downward in a convex fashion, which as a result of gravity, produces a sealed contact and good travel properties.

If the rear section of the sliding lid 2 is curved in a convex fashion along with the window or windows 20 in a manner corresponding to the front section, then the embodiment can be the same as the one provided in the front section.

As shown in FIG. 3, the rear frame part 55 of the cover frame 5 is likewise provided with a rear guide section that has an upper support section 551 and a lower support section 552 that is recessed downward relative to the former, each with a respective horizontal support surface. The upper support section 551 in this case is bounded at the rear by a vertical, rear guide section while the lower support section 552 is bounded by a vertical rear guide section 550 that points upward and adjoins the front of the upper support section 551. Toward the front, the upper support section 551 and lower support section 552 each likewise transition into the refrigeration compartment without a projection protruding upward and can easily be kept clean.

In addition, the underside of the rear frame part 55 has a receiving section 553 at the rear, which is bounded by a vertical, outer boundary section 554 at the rear, and by a vertical, inner boundary section 555 on the inside so that upper sections of the rear wall 61 of the housing 6 can be easily inserted into the rear receiving section 553 and accommodated there in a stable fashion.

The inner coating 21 of the windows 20 is also shown in FIG. 3. The guidance by the horizontal receiving sections 552, 553 in cooperation with the horizontal bearing surface of the rear bearing section 350 augments the effortless, advantageously sealed guidance of the sliding lid 2.

The invention claimed is:

1. A cooling appliance (1), comprising:
a housing (6) including at least one refrigeration compartment that is accessible from above, the housing (6) including a cover frame (5) with a front frame part (50), the front frame part (50) including a support section (512) oriented horizontally relative to a vertical direction of gravity, and a front guide section (511) having a vertical inner surface extending vertical from the support section (512);
at least one laterally movable sliding lid (2) extending over the at least one refrigeration compartment, the sliding lid having a transparent window (20) which has a heat-reflecting inner coating (21) and at least in a front longitudinal region via an outwardly convex curvature perpendicular to a longitudinal direction comes to an end in a longitudinal edge that has a front frame (30) adjacent the front frame part (50) of the housing (6), the front frame (30) having a bearing surface (312) oriented horizontally relative to the vertical direction of gravity, wherein the bearing surface (312) has a sealing element in contact with the horizontal support section (512); and
spacer elements (314) that protrude beyond a frontal plane of the front frame (30) that is perpendicular to the bearing surface (312), wherein the spacer elements are spaced apart from the vertical inner surface of the front guide section (511), wherein the spacer elements (314) are formed convex outward toward the vertical inner surface of the front guide section (511) so that the spacer elements (314) provide a point-by-point support opposite to the vertical inner surface of the front guide section (511);
wherein the sealing element forms a sealed sliding surface upon which the front frame (30) travels along the first surface of the front frame part (50) upon movement of the sliding lid (2), and wherein the spacer elements prevent the sliding lid (2) from wedging in the cover frame (5) as the sliding lid (2) is moved.

2. The cooling appliance according to claim 1, wherein a front cross-sectionally vertical edge of the front frame (30) serves as a supporting section (313) for a longitudinal guidance and has the spacer elements (314) that protrude beyond the frontal plane.

3. The cooling appliance according to claim 2, wherein the front frame is in a form of a longitudinal profile with a connecting section (300) that embraces an inner surface region and an outer surface region of the transparent window at a front longitudinal edge and has a bearing section (310) that is formed onto and oriented at an angle to it, which has the bearing surface (312).

4. The cooling appliance according to claim 3, wherein an underside of the sealing element has good sliding properties and is a separate sealing element (7) that is mounted on the bearing surface (312).

5. The cooling appliance according to claim 4, wherein the bearing section (310) has a longitudinally extending receiving chamber (311) bounded on an underside by an end wall with the bearing surface (312) and into which a holding section of the sealing element (7) is inserted.

6. The cooling appliance according to claim 5, wherein the spacer elements (314) have externally arched support surfaces.

7. The cooling appliance according to claim 6, wherein a rear longitudinal edge of the transparent window (20) has a rear frame (35) that has a bearing section (350) with a horizontal bearing surface on an underside.

8. The cooling appliance according to claim 7, wherein the transparent window (20) rises from the front longitudinal edge via the convex curvature and transitions into a flat, horizontal region that adjoins at a rear with the rear longitudinal edge having the rear frame (35) that has the horizontal bearing surface.

9. The cooling appliance according to claim 8, wherein an upper edge region of the housing (6) has the cover frame (5) that has at least one longitudinally extending support surface (510) which is matched to a position and a size of the bearing surface (312), and has the guide section (511) which is matched to a second position and a second size of the supporting section (313).

10. The cooling appliance according to claim 2, wherein the spacer elements (314) have externally arched support surfaces.

11. The cooling appliance according to claim 1, wherein the front frame is in a form of a longitudinal profile with a connecting section (300) that embraces an inner surface region and an outer surface region of the transparent window at a front longitudinal edge and has a bearing section (310) that is formed onto and oriented at an angle to it, which has the bearing surface (312).

12. The cooling appliance according to claim 11, wherein the bearing section (310) has a longitudinally extending receiving chamber (311) bounded on an underside by an end wall with the bearing surface (312) and into which a holding section of the sealing element (7) is inserted.

13. The cooling appliance according to claim 1, wherein an underside of the sealing element has good sliding properties and is a separate sealing element (7) that is mounted on the bearing surface (312).

14. The cooling appliance according to claim 1, wherein a rear longitudinal edge of the transparent window (20) has a rear frame (35) that has a bearing section (350) with a horizontal bearing surface on an underside.

15. The cooling appliance according to claim 14, wherein the transparent window (20) rises from a front longitudinal edge via the convex curvature and transitions into a flat, horizontal region that adjoins at a rear with a rear longitudinal edge of the rear frame (35) that has the horizontal bearing surface.

16. The cooling appliance according to claim 1, wherein an upper edge region of the housing (6) has the cover frame (5) that has at least one longitudinally extending support surface (510) which is matched to a position and a size of the bearing surface (312), and has the guide section (511) which is matched to a second position and a second size of the supporting section (313).

17. The cooling appliance according to claim 1, wherein each of the spacer elements (314) is a rivet that provides a rounded point contact surface facing the vertical inner surface of the front guide section (511).

* * * * *